US012732965B2

(12) United States Patent
Zhang et al.

(10) Patent No.: US 12,732,965 B2
(45) Date of Patent: Sep. 8, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 297 days.

(21) Appl. No.: 18/204,696

(22) Filed: Jun. 1, 2023

(65) Prior Publication Data

US 2023/0328695 A1 Oct. 12, 2023

Related U.S. Application Data

(63) Continuation of application No. PCT/CN2020/137719, filed on Dec. 18, 2020.

(51) Int. Cl.
*H04W 72/25* (2023.01)
*H04W 28/26* (2009.01)
*H04W 72/02* (2009.01)

(52) U.S. Cl.
CPC ........... *H04W 72/02* (2013.01); *H04W 28/26* (2013.01); *H04W 72/25* (2023.01)

(58) Field of Classification Search
CPC ..... H04W 72/02; H04W 28/26; H04W 72/25; H04W 4/021; H04W 4/023; H04W 72/40; H04W 72/51; H04W 4/40; H04W 72/54
See application file for complete search history.

(56) References Cited

U.S. PATENT DOCUMENTS

2020/0022089 A1* 1/2020 Guo .................... H04W 52/242
2020/0288471 A1 9/2020 Yoon
(Continued)

FOREIGN PATENT DOCUMENTS

CN 105594151 A 5/2016
CN 110958096 A1 4/2020
(Continued)

OTHER PUBLICATIONS

Intel ("Summary for AI 7.2.4.2.2 Mode-2 Resource Allocation", 3GPP Draft; R1-1905652, Apr. 8, 2019.*
(Continued)

*Primary Examiner* — Lakeram Jangbahadur
(74) *Attorney, Agent, or Firm* — Sheppard, Mullin, Richter & Hampton LLP

(57) ABSTRACT

A wireless communication method and a terminal device are provided, capable of avoiding data transmission problems due to hidden nodes and half-duplex in sidelink transmission. The method includes: transmitting, by a first terminal when a specific condition is satisfied, a reference resource set to a second terminal, the reference resource set being used by the second terminal to select a sidelink resource. It can reduce the burden on the second terminal due to the complexity in resource selection by the second terminal when the second terminal receives reference resource sets transmitted from too many terminals. The first terminal only transmits the reference resource set under a specific condition, which is advantageous in that the first terminal only reports the determined reference resource set to the terminal for which the reference resource set has the highest reference value, so as to improve the reliability of subsequent data transmission.

17 Claims, 6 Drawing Sheets

(56) References Cited

U.S. PATENT DOCUMENTS

| | | | | |
|---|---|---|---|---|
| 2021/0243749 A1* | 8/2021 | Hoang | .................. | H04W 72/02 |
| 2022/0190984 A1* | 6/2022 | Lee | ....................... | H04W 72/20 |
| 2023/0300799 A1* | 9/2023 | Lee | ....................... | H04W 72/02 |

FOREIGN PATENT DOCUMENTS

| | | | | |
|---|---|---|---|---|
| CN | 110958586 A | 4/2020 | | |
| CN | 111278108 A | 6/2020 | | |
| WO | WO-2020062999 A1 * | 4/2020 | ............ | H04W 72/12 |

OTHER PUBLICATIONS

International Search Report and Written Opinion dated Jul. 7, 2021 in International Application No. PCT/CN2020/137719. English translation attached.

Moderator (LG Electronics), "Feature lead summary for AI 8.11.2.2 Feasibility and benefits for mode 2 enhancements", #3GPP TSG RAN WG1 #103-e, R1-2009788, Nov. 13, 2020.

Huawei, HiSilicon, "Inter-UE coordination in sidelink resource allocation", 3GPP TSG RAN WG1 Meeting #103-e R1-2007616, Nov. 13, 2020.

Samsung, "On Feasibility and Benefits for Mode2 Enhancements", 3GPP TSG RAN WG1 #103-e, R1-2008190, Nov. 13, 2020.

Ericsson, "Feasibility and benefits of mode 2 enhancements for inter-UE coordination", 3GPP TSG-RAN WG1 Meeting #103-e, R1-2009073, Aug. 28, 2020.

Qualcomm Incorporated, "Reliability and Latency Enhancements for Mode 2", 3GPP TSG RAN WG1 Meeting #103-e, R1-2009273, Nov. 13, 2020.

Vivo, "Discussion on mode 2 enhancements", 3GPP TSG RAN WG1 #103-e, R1-2007689, Nov. 13, 2020.

LG Electronics, "Discussion on feasibility and benefits for mode 2 enhancement", 3GPP TSG RAN WG1 Meeting #103-e, R1-2007896, Nov. 13, 2020.

Communication pursuant to Article 94(3) EPC of European application No. 20965650.3 issued on Aug. 20, 2024.

Extended European Search Report dated Dec. 4, 2023 received in European Patent Application No. EP20965650.3.

Intel Corporation:"Summary for AI 7.2.4.2.2 Mode-2 Resource Allocation" 3GPP Draft; R1-1905652, Summary of 5G V2X Mode 2, 3rd Generation Partnership Project (3GPP), Mobile Competence Centre ; 650, Route Des Lucioles ; F-06921 Sophia-Antipolis Cedex ) France vol. RAN WG1, No. xi'an, China; Apr. 8, 2019-Apr. 12, 2019,Apr. 8, 2019 (Apr. 8, 2019), XP051707711.

Communication pursuant to Article 94(3) EPC of counterpart European application No. 20965650.3 issued on Dec. 3, 2025, 6 pages.

Communication pursuant to Article 94(3) EPC of European application No. 20965650.3 issued on Apr. 1, 2025.

* cited by examiner

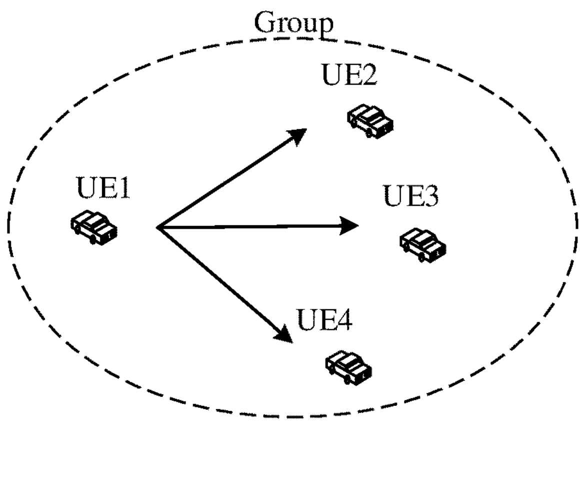
FIG. 5
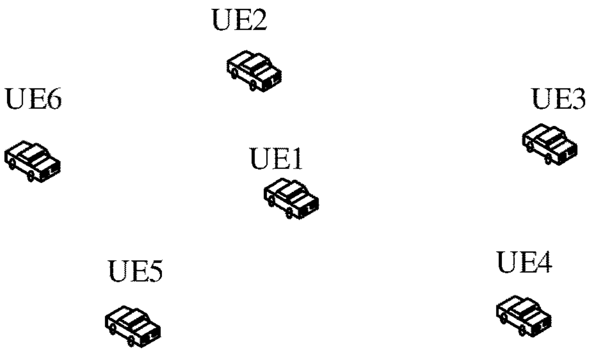
FIG. 6
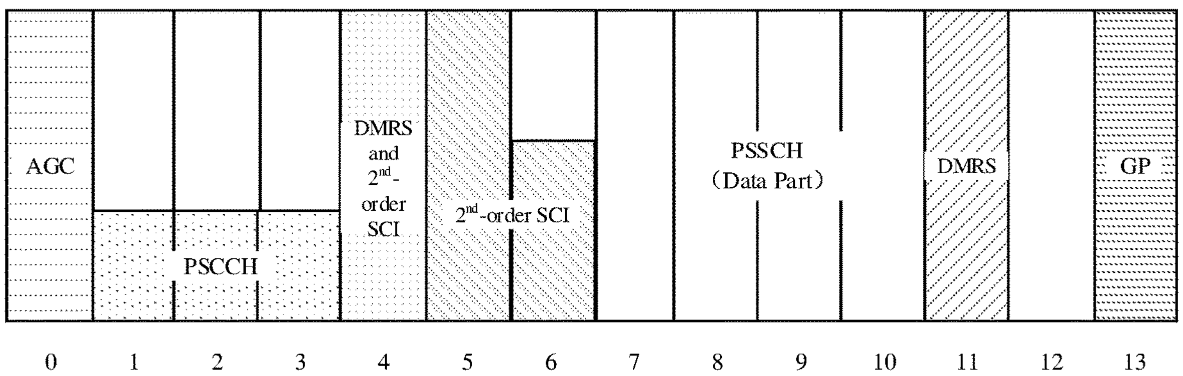
FIG. 7

WIRELESS COMMUNICATION METHOD AND TERMINAL DEVICE

CROSS-REFERENCE TO RELATED APPLICATIONS

This application is a continuation of International Application No. PCT/CN2020/137719 filed on Dec. 18, 2020, the entire disclosure of which is incorporated herein by reference.

TECHNICAL FIELD

The embodiments of the present disclosure relate to communication technology, and more particularly, to a wireless communication method and a terminal device.

BACKGROUND

In the New Radio Vehicle to Everything (NR-V2X) system, two transmission modes are defined: a first mode and a second mode. In the first mode, transmission resources of a terminal are allocated by a base station, and the terminal transmits data on a sidelink according to the resources allocated by the base station. In the second mode, the terminal selects a resource from a resource pool for data transmission.

In the transmission scheme based on the second mode, the terminal randomly selects a transmission resource in a resource pool, or selects a transmission resource according to a listening result. This resource selection scheme can avoid interference between terminals to a certain extent, but there are other problems, such as data transmission interference caused by a hidden node, and resource waste due to half-duplex.

In the transmission scheme based on the second mode, a scheme is introduced where a terminal (denoted as UE-A) transmits a reference resource set to another terminal (denoted as UE-B) to assist the other terminal in resource selection. The terminal that transmits the reference resource set is referred as a resource coordination terminal. In practice, if the number of resource coordination terminals is large, the number of reference resource sets transmitted will also be large. In this case, for the receiving terminal, how to perform resource selection according to these resource sets is also a problem. In addition, the resource coordination terminals need to use different resources to transmit the reference resource sets, which may cause resource congestion. Therefore, how to perform efficient and limited reporting of reference resource sets is a problem to be solved.

SUMMARY

Embodiments of the present disclosure provide a wireless communication method and a terminal device, capable of avoiding data transmission problems due to hidden nodes and half-duplex in sidelink transmission.

In a first aspect, a wireless communication method is provided. The method includes: transmitting, by a first terminal when a specific condition is satisfied, a reference resource set to a second terminal, the reference resource set being used by the second terminal to select a sidelink resource.

In a second aspect, a wireless communication method is provided. The method includes: receiving, by a second terminal, a reference resource set transmitted by a first terminal when a condition is satisfied; and selecting, by the second terminal, a sidelink resource according to the reference resource set.

In a third aspect, a terminal device is provided. The terminal device is configured to perform the method according to the above first aspect or any possible implementation thereof. In particular, the terminal device includes one or more functional modules configured to perform the method according to the above first aspect or any possible implementation thereof.

In a fourth aspect, a terminal device is provided. The terminal device is configured to perform the method according to the above second aspect or any possible implementation thereof. In particular, the terminal device includes one or more functional modules configured to perform the method according to the above second aspect or any possible implementation thereof.

In a fifth aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In a sixth aspect, a terminal device is provided. The terminal device includes a processor and a memory. The memory has a computer program stored thereon, and the processor is configured to invoke and execute the computer program stored in the memory to perform the method according to the above second aspect or any implementation thereof.

In a seventh aspect, a chip is provided. The chip is configured to perform the method according to the above first or second aspect or any implementation thereof.

In particular, the chip includes a processor configured to invoke and execute a computer program from a memory, to cause a device provided with the chip to perform the method according to the above first or second aspect or any implementation thereof.

In an eighth aspect, a computer-readable storage medium is provided. The computer-readable storage medium stores a computer program that causes a computer to perform the method according to the above first or second aspect or any implementation thereof.

In a ninth aspect, a computer program product is provided. The computer program product includes computer program instructions that cause a computer to perform the method according to the above first or second aspect or any implementation thereof.

In a tenth aspect, a computer program is provided. The computer program, when executed on a computer, causes the computer to perform the method according to the above first or second aspect or any implementation thereof.

With the above technical solutions, on one hand, the first terminal only transmits the reference resource set under a specific condition, which can reduce the burden on the second terminal due to the complexity in resource selection by the second terminal when the second terminal receives reference resource sets transmitted from too many terminals. On the other hand, the first terminal only transmits the reference resource set under a specific condition, which is advantageous in that the first terminal only reports the determined reference resource set to the terminal for which the reference resource set has the highest reference value, so as to improve the reliability of subsequent data transmission.

BRIEF DESCRIPTION OF DRAWINGS

FIG. 5 is a schematic diagram showing multicast sidelink communication according to the present disclosure.

FIG. 6 is a schematic diagram showing broadcast sidelink communication according to the present disclosure.

FIG. 7 is a schematic diagram showing frame structures of PSCCH and PSSCH according to the present disclosure.

FIG. 8 is a schematic diagram showing sidelink transmission based on the second mode.

FIG. 9 is a schematic diagram showing another sidelink transmission based on the second mode.

DESCRIPTION OF EMBODIMENTS

Figure 1:
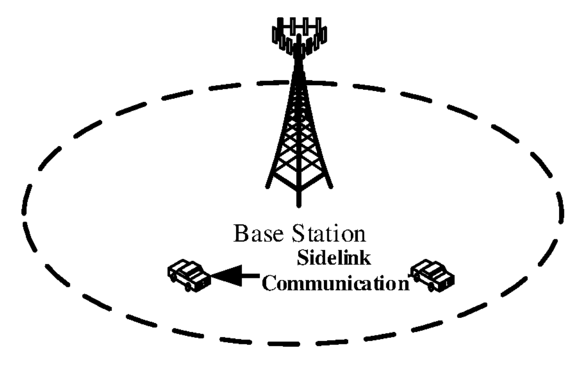
FIG. 1 is a schematic diagram showing sidelink communication within network coverage according to the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Zone Networks (WLAN), Wireless Fidelity (WiFi), the 5th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

In addition, the terms “system” and “network” may often be used interchangeably herein. The term “and/or” as used herein only represents a relationship between correlated objects, including three relationships. For example, “A and/or B” may mean A only, B only, or both A and B. In addition, the symbol “/” as used herein represents an “or” relationship between the correlated objects preceding and succeeding the symbol.

The terms used in the embodiments of the present disclosure are provided only for explaining the specific embodiments of the present disclosure, rather than limiting the present disclosure. The terms such as “first”, “second”, “third”, “fourth”, etc., as used in the description, claims and figures of the present disclosure are used for distinguishing different objects from each other, rather than defining a specific order. In addition, the terms such as “include” and “have” and any variants thereof are intended to cover non-exclusive inclusion.

It can be appreciated that the term “indication” as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term “corresponding” may mean that there is a direct or indirect correspondence between the two, or may mean that there is an association between the two, or that they are in a relation of indicating and indicated, configuring or configured, or the like.

Figure 2:
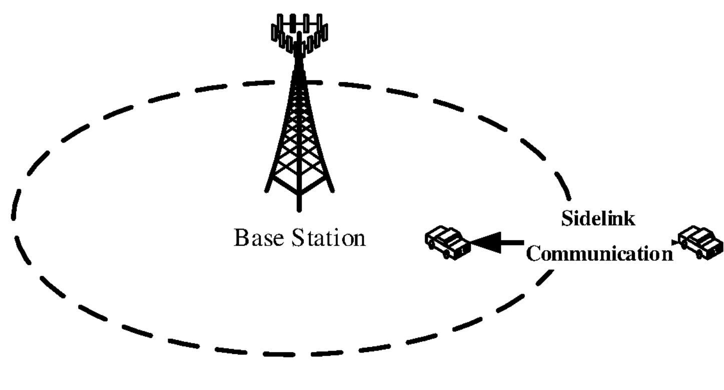
FIG. 2 is a schematic diagram showing sidelink communication with partial network coverage according to the present disclosure.
Figure 3:
FIG. 3 is a schematic diagram sidelink communication out of network coverage according to the present disclosure.

It should be noted that, depending on the network coverage condition of communicating terminals, sidelink communication can be divided into sidelink communication within network coverage, as shown in FIG. 1, sidelink communication with partial network coverage, as shown in FIG. 2, and sidelink communication out of network coverage, as shown in FIG. 3.

In FIG. 1, in the sidelink communication within network coverage, all terminals performing sidelink communication are within the coverage of the same base station, such that the terminals can receive configuration signaling from the base station, and perform sidelink communication based on the same sidelink configuration.

In FIG. 2, in the sidelink communication with partial network coverage, some terminals performing sidelink communication are located within the coverage of the base station, and these terminals can receive configuration signaling from the base station, and perform sidelink communication according to the configuration from the base station. The terminals located outside the network coverage cannot receive the configuration signaling from the base station. In this case, the terminals outside the network coverage will determine sidelink configuration according to pre-configuration information and information carried in Physical Sidelink Broadcast Channels (PSBCHs) transmitted by terminals within the network coverage and perform sidelink communication.

In FIG. 3, in the sidelink communication out of network coverage, all terminals performing sidelink communication are located outside the network coverage, and all terminals determine sidelink configuration according to pre-configuration information and perform sidelink communication.

It should be noted that, Device-to-Device communication is a Sidelink (SL) transmission technology based on D2D, which is different from traditional cellular systems where communication data is received or transmitted via base stations and thus has higher spectral efficiency and lower transmission delay. The Internet of Vehicles system adopts D2D direct communication. The 3GPP defines two transmission modes, a first mode and a second mode. The embodiments of the present disclosure can be applied in the first mode and/or the second mode.

First Mode:

Transmission resources of a terminal are allocated by a base station, and the terminal transmits data on a sidelink according to the resources allocated by the base station. The base station can allocate resources for a single transmission to the terminal, or allocate semi-static transmission resources for the terminal. As shown in FIG. 1, the terminal is located within the network coverage, and the network allocates transmission resources for sidelink transmission to the terminal.

Second Mode:

The terminal selects a resource from the resource pool for data transmission. As shown in FIG. 3, the terminal is located outside the coverage zone of the cell, and the terminal autonomously selects transmission resources from the preconfigured resource pool for sidelink transmission; or as shown in FIG. 1, the terminal autonomously selects transmission resources for sidelink transmission from a resource pool configured by the network.

It should be noted that in NR-V2X, a user may be in a mixed mode, that is, the user can use both the first mode and the second mode to obtain resources.

In NR-V2X, autonomous driving needs to be supported, and thus higher requirements, such as higher throughput, lower latency, higher reliability, larger coverage, more flexible resource allocation, are imposed on data interaction between vehicles.

Figure 4:
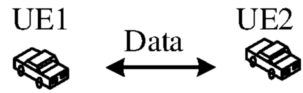
FIG. 4 is a schematic diagram showing unicast sidelink communication according to the present disclosure.

In Long Term Evolution Vehicle to Everything (LTE-V2X), broadcast transmission is supported, and in NR-V2X, unicast and multicast transmission are introduced. For unicast transmission, there is only one terminal at the receiving end. As shown in FIG. 4, unicast transmission is performed between UE1 and UE2. For multicast transmission, its receiving end includes all terminals in a communication group, or all terminals within a certain transmission distance. As shown in FIG. 5, UE1, UE2, UE3, and UE4 form a communication group, where UE1 transmits data, and other terminal devices in the group are receiving terminals. For broadcast transmission, the receiving end includes any terminal around the transmitting terminal. As shown in FIG. 6, UE1 is a transmitting terminal, and other terminals around it, UE2 to UE6, are all receiving terminals.

In NR-V2X, 2-stage Sidelink Control Information (SCI) is introduced. The first-stage SCI is carried in a Physical Sidelink Control Channel (PSCCH) to indicate information for a Physical Sidelink Shared Channel (PSSCH) such as transmission resources, reserved resource information, Modulation and Coding Scheme (MCS) level, priority, and the like. The second-stage SCI is transmitted in the resources for the PSSCH, is demodulated using a Demodulation Reference Signal (DMRS) for the PSSCH, and indicates information for data demodulation, such as a Source Identity (ID), a Destination ID, a Hybrid Automatic Repeat reQuest (HARQ) ID, and a New Data Indicator (NDI). The second-stage SCI is mapped from the first DMRS symbol of the PSSCH, first in the frequency domain and then in the time domain. As shown in FIG. 7, the PSCCH occupies 3 symbols (Symbol 1, Symbol 2, Symbol 3), the DMRS for the PSSCH occupies Symbol 4 and Symbol 11, and the second-stage SCI is mapped from Symbol 4, frequency division multiplexed with the DMRS on Symbol 4, and mapped to Symbol 4, Symbol 5, and Symbol 6, and the resource size occupied by the second-stage SCI depends on the number of bits of the second-stage SCI.

In the transmission method based on the second mode, the terminal randomly selects transmission resources in the resource pool, or selects transmission resources according to the listening result. This resource selection method can avoid interference between terminals to a certain extent, but there are still the following problems:

Hidden Node Problem:

As shown in FIG. 8, Terminal B selects a resource by listening, and uses the resource to transmit sidelink data to Terminal A. Since Terminal B and Terminal C are far apart, they cannot detect each other's transmissions. Therefore, Terminal B and Terminal C may select the same transmission resource, the data transmitted by Terminal C will interfere with the data transmitted by Terminal B, resulting in the hidden node problem.

Half-Duplex Problem:

When a terminal selects a transmission resource by listening, in the listening window, if the terminal transmits sidelink data on a certain time slot, due to the half-duplex limitation, the terminal cannot receive data transmitted by other terminals on this time slot and doesn't have a listening result. Therefore, when the terminal performs resource exclusion, it will exclude all resources corresponding to the time slot in the selection window to avoid interference with other terminals. Due to the limitation of half-duplex, the terminal may exclude many resources that do not need to be excluded.

Exposed Terminal Problem:

As shown in FIG. 9, both the transmitting Terminal B and the transmitting Terminal C can monitor each other, but the target receiving Terminal A of the transmitting Terminal B is far away from the transmitting terminal C, and the target receiving Terminal D of the Transmitting terminal C is far away from the transmitting Terminal B. In this case, even if the transmitting Terminal B and the transmitting Terminal C use the same time-frequency resource, it will not affect the reception by their respective target receiving terminals. However, due to the close geographical locations of the two terminals, high receiving power of each other's signal may be detected during the listening process, such that they may choose orthogonal time-frequency resources, which may eventually lead to a degradation in resource utilization.

Power Consumption Problem:

In the above listening process, the terminal needs to continuously listen to resources to determine which resources are available. However, such continuous resource listening by the terminal needs to consume a lot of energy. This is not a problem for vehicle-mounted terminals as they have power supply devices, but for handheld terminals, excessive energy consumption will cause the terminals to run out of power quickly. Therefore, how to reduce the energy consumption of the terminal is also a problem that needs to be considered in the resource selection process.

Due to the above problems in the resource selection process based on the second mode, an enhanced resource selection solution is proposed. On the basis of the resource listening based on the second mode, one terminal (UE-A) may transmit a reference resource set to another terminal (UE-B) to assist UE-B in resource selection. The reference resource set may be a resource set suitable for use by UE-B. When UE-B selects a resource for transmitting sidelink data to the target receiving terminal, it may preferentially select the resource from the available resource set, thereby improving the reliability of the target receiving terminal receiving the sidelink data. The reference resource set may be a resource set not suitable for use by UE-B, and UE-B avoids selecting resources in the resource set when selecting resources, thereby avoiding the above problems associated with hidden nodes, half-duplex limitations, etc. The terminal having the functions of UE-A is referred to as a resource coordination terminal.

Compared with the scheme in which the terminal autonomously selects transmission resources in the second mode, in the above resource allocation scheme, the terminal considers reference resource sets transmitted by other terminals for resource selection in the process of resource selection, so as to improve transmission reliability.

However, if the number of resource coordination terminals is too large, the number of reference resource sets transmitted will also be large, so for UE-B, how to perform resource selection based on so many reference resource sets would be a problem. Moreover, the resource coordination terminals need to use different resources to transmit the reference resource sets, which may cause resource congestion.

Based on the above technical problems, the present disclosure proposes a technical solution where a resource coordination terminal transmits a reference resource set to another terminal device only when a specific condition is satisfied, thereby avoiding or mitigating the above problems to a certain extent.

The technical solutions of the present disclosure will be described in detail below with reference to specific examples.

Figure 10:
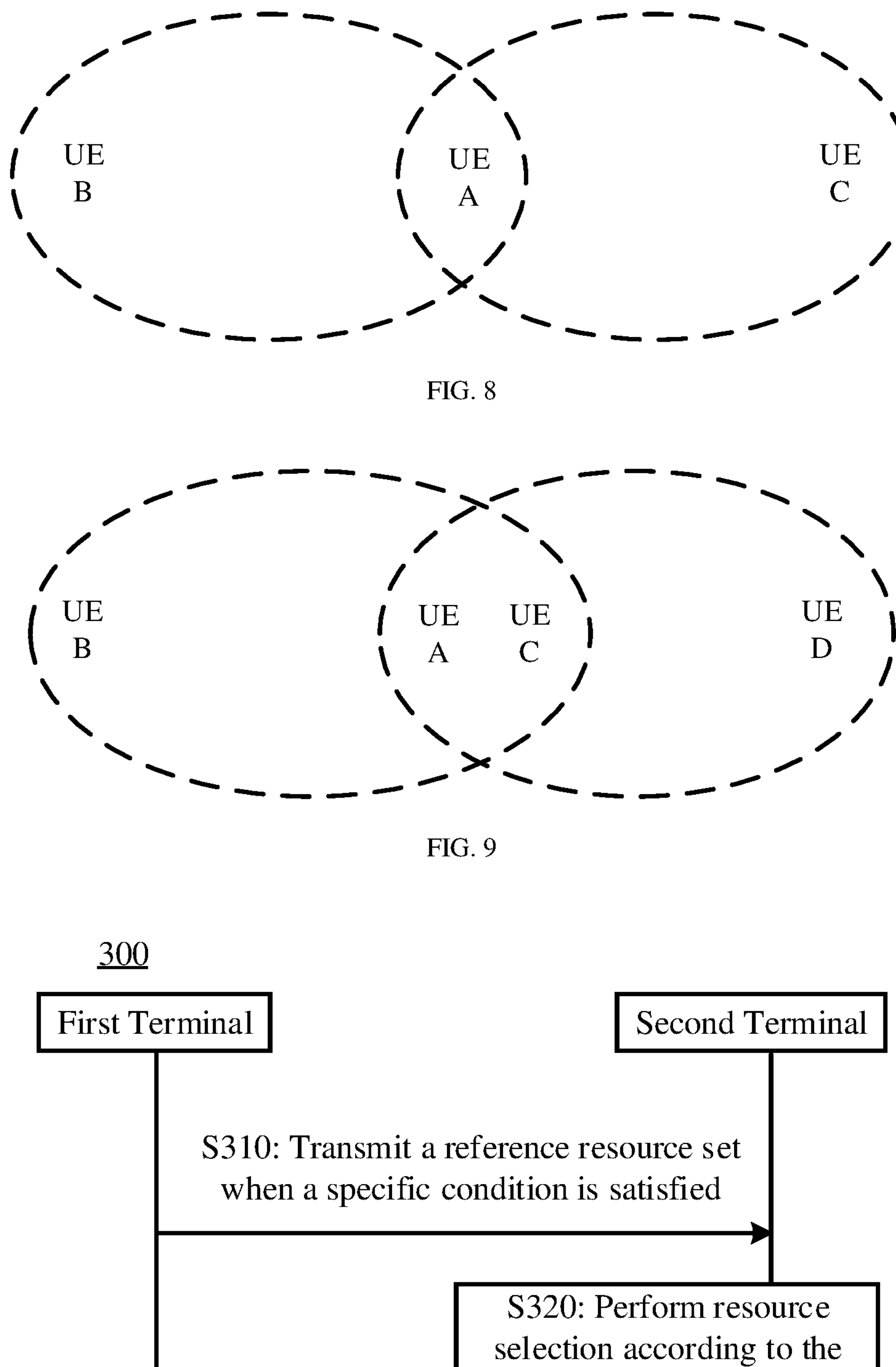
FIG. 10 is a schematic interaction diagram showing a wireless communication method according to an embodiment of the present disclosure.

FIG. 10 is a schematic interaction diagram showing a wireless communication method 100 according to an embodiment of the present disclosure. As shown in FIG. 10, the method 300 may include at least part of the following content.

At S310, when a specific condition is satisfied, a first terminal transmits a reference resource set to a second terminal. The reference resource set is used by the second terminal to select a sidelink resource.

At S320, the second terminal selects the sidelink resource according to the reference resource set.

That is, the first terminal acts as a resource coordination terminal and performs the behavior of the resource coordination terminal only under the specific condition.

In an embodiment of the present disclosure, the first terminal may correspond to the above UE-A, and the second terminal may correspond to the above UE-B.

In some embodiments, the first terminal and the second terminal may be member terminals of a same group. For example, the second terminal may be a transmitting terminal in multicast communication, and the first terminal may be one of receiving terminals in the multicast communication.

Optionally, in some embodiments, the first terminal and a member terminal in a group to which the second terminal belongs may have established a connection, such as a PC5 connection, with each other.

Optionally, in some embodiments, no connection may be established between the first terminal and a member terminal in the group to which the second terminal belongs. In this case, when the second terminal transmits a Physical Sidelink Control Channel (PSCCH) or a Physical Sidelink Shared Channel (PSSCH) by means of multicast, the second terminal does not know the transmitted PSCCH or PSSCH will be received by which terminal, the first terminal can feedback HARQ-NACK when it successfully receives the PSCCH but fails to decode the PSSCH scheduled by the PSCCH, and does not provide any HARQ feedback in other cases. In this case, the second terminal cannot determine which terminal does not receive the PSSCH correctly.

Optionally, the first terminal may determine whether the specific condition is satisfied according to a resource collision condition between the second terminal and other terminals, a number of first terminals and a number of member terminals in the communication group to which the second terminal belongs, a number of corresponding receiving terminals when the second terminal serves as the transmitting terminal, link quality between the first terminal and the second terminal, a distance between the first terminal and the second terminal, or an indication from the second terminal.

Optionally, in some embodiments, the specific condition may include at least one of:

one or more resources reserved by the second terminal for future interfering with a resource reserved by another terminal;

a resource used by the second terminal to transmit a sidelink channel in future overlapping a resource used by a third terminal to transmit a sidelink channel, the second terminal being a receiving terminal of the sidelink channel transmitted by the third terminal;

a distance between the first terminal and the second terminal being greater than a first threshold and smaller than a second threshold;

the first terminal failing to decode the sidelink channel transmitted by the second terminal for N consecutive times, where N is a positive integer;

the first terminal receiving first indication information from the second terminal, the first indication information indicating that a member terminal of a group to which the first terminal belongs is allowed to transmit the reference resource set to the second terminal;

the first terminal receiving second indication information from the second terminal, the second indication information indicating that the first terminal is allowed to transmit the reference resource set to the second terminal; or the first terminal having performed resource reselection, and a number of member terminals in a group where the second terminal belongs is smaller than a third threshold.

Optionally, if the first terminal is a receiving terminal of a PSCCH/PSSCH transmitted by the second terminal, the first terminal may determine from received SCI that one or more resources reserved or pre-selected by the second terminal for the future will interfere with a resource reserved by another terminal, or the first terminal may determine from the received SCI that a resource to be used by the second terminal to transmit the PSCCH/PSSCH in the future overlaps a resource used by a third terminal to transmit a PSCCH/PSSCH, the second terminal being a receiving terminal of the third terminal.

If the one or more resources reserved or pre-selected by the second terminal for the future will interfere with the resource reserved or pre-selected by the other terminal, in the future, when the second terminal uses the resource(s) for sidelink transmission, the communication quality will be degraded. In this case, the first terminal can transmit the reference resource set to the second terminal. For example, the reference resource set may include the resources with interference to assist the second terminal in resource selection, so as to avoid selecting these resources and improve communication quality.

"The resource to be used by the second terminal to transmit the sidelink channel in the future overlapping the resource used by a third terminal to transmit the sidelink channel, the second terminal being the receiving terminal of the sidelink channel transmitted by the third terminal" means that the transmission resource and reception resource of the second terminal overlap. Due to the half-duplex problem in sidelink transmission, a terminal cannot transmit and receive data at the same time. The transmission resource reserved or pre-selected by the second terminal will affect data reception in the future. In this case, the first terminal can transmit the reference resource set to the second terminal. For example, the reference resource set may include the resource used by the third terminal to transmit data, and assist the second terminal in resource selection. In this way, the second terminal can avoid selecting these resources, such that the half-duplex problem can be avoided.

Optionally, in an embodiment of the present disclosure, a resource may refer to a time-frequency resource.

Optionally, the distance between the first terminal and the second terminal may be a distance between a geographic location of the first terminal and a center of a zone where the second terminal is located. For example, the second terminal may transmit SCI to the first terminal, and the SCI may include a target zone identity (ID). The distance between the first terminal and the second terminal may be the distance between the geographic location of the first terminal and the center of the zone corresponding to the target zone ID.

Optionally, in an embodiment of the present disclosure, the SCI may be a second-stage SCI.

Optionally, a format of the second-stage SCI may be format 2-B.

Optionally, in some embodiments, the first threshold may be preconfigured, configured by a network device, predefined, or configured by the second terminal. For example, the second terminal may configure the first threshold via SCI. In another example, the network device may configure the first threshold via Downlink Control Information (DCI). In another example, the network device may configure the first threshold via Radio Resource Control (RRC) signaling.

Optionally, in some embodiments, the second threshold may be preconfigured, configured by a network device, predefined, or configured by the second terminal. For example, the second terminal may configure the second threshold via SCI. In another example, the network device may configure the second threshold via DCI. In another example, the network device may configure the second threshold via RRC signaling.

As an example, the second threshold may be a target communication range (Communication Range Requirement) carried in SCI transmitted by the second terminal to the first terminal.

The first terminal failing to decode the sidelink channel transmitted by the second terminal for N consecutive times indicates low link quality between the first terminal and the second terminal. In this case, the first terminal can transmit the reference resource set to the second terminal, such that the second terminal can select an appropriate transmission resource and improve communication quality between the two.

Optionally, N may be preconfigured, configured by a network device, predefined, or configured by the second terminal. For example, the second terminal may configure N via SCI. In another example, the network device may configure N via DCI. In another example, the network device may configure N via RRC signaling.

Optionally, the first indication information may be transmitted by the second terminal by means of multicast. For example, the second terminal may transmit the first indication information to other terminals in the communication group by means of multicast via PC5 RRC signaling.

In some embodiments, the second terminal may transmit the first indication information under a specific condition, indicating that all member terminals in the communication group are allowed to transmit the reference resource set.

As an embodiment, the second terminal may determine whether to transmit the first indication information according to the number of member terminals in the group, geographic locations and feedback information conditions of the member terminals in the group, and the like.

For example, the second terminal may transmit the first indication information when the number of member terminals in the communication group is smaller than a certain threshold. If the number of member terminals in the communication group is smaller than the certain threshold, even if all the member terminals in the communication group transmit the reference resource set to the second terminal, congestion may not occur.

In another example, the second terminal may transmit the first indication information when a distance between a member terminal in the communication group and the second terminal is greater than a certain threshold.

In another example, the second terminal may transmit the first indication information when the number or proportion of Hybrid Automatic Repeat request Negative Acknowledgments (HARQ-NACKs) fed back from the member terminals in the communication group to the second terminal is lower than a certain threshold.

In some embodiments, the second terminal may transmit the second indication information under a specific condition, indicating that a specific terminal, for example, the first terminal, is allowed to transmit the reference resource set.

As an example, the second terminal may determine whether to transmit the second indication information, or determine whether to instruct the first terminal to transmit the reference resource set, according to the geographic location of the first terminal, the distance between the first terminal and the second terminal, the condition of feedback information transmitted by the first terminal to the second terminal, and the like.

For example, if the distance between the first terminal and the second terminal is greater than a certain threshold, the second indication information is transmitted.

In another example, if the number or proportion of HARQ-NACKs fed back by the first terminal to the second terminal is lower than a certain threshold, the second indication information is transmitted.

The number of member terminals in the communication group to which the second terminal belongs being smaller than the third threshold indicates that the number of member terminals in the communication group to which the second terminal belongs is relatively small. Even if all the member terminals feedback the reference resource set, the congestion problem may not occur, and in this case, the first terminal may transmit the reference resource set to the second terminal.

As an implementation, if the first terminal determines that the resources reserved or pre-selected by the second terminal for the future interfere with the resources reserved or pre-selected by another terminal, or the transmission resource of the second terminal and the reception resource of the second terminal overlap (that is, there is a half-duplex problem), and the distance between the first terminal and the second terminal is greater than the first threshold and smaller than the second threshold, the first terminal determines that the specified condition is satisfied.

As another implementation, if the first terminal determines that the resources reserved or pre-selected by the second terminal for the future interfere with the resources reserved or pre-selected by another terminal, or the transmission resource of the second terminal and the reception resource of the second terminal overlap (that is, there is a half-duplex problem), and the first terminal fails to decode the PSSCH transmitted by the second terminal for N consecutive times, the first terminal determines that the specific condition is satisfied.

As yet another implementation, if the first terminal determines that the resources reserved or pre-selected by the second terminal for the future interfere with the resources reserved or pre-selected by another terminal, or the transmission resource of the second terminal and the reception resource of the second terminal overlap, and the first terminal receives the first indication information from the second terminal, the first terminal determines that the specific condition is satisfied.

As yet another implementation, if the first terminal determines that the resources reserved or pre-selected by the second terminal for the future interfere with the resources reserved or pre-selected by another terminal, or the transmission resource of the second terminal and the reception resource of the second terminal overlap (that is, there is a half-duplex problem), and the first terminal receives the second indication information from the second terminal, the first terminal determines that the specific condition is satisfied.

It should be understood that the above specific conditions are only examples. In other embodiments, the first terminal may transmit the reference resource set to the second terminal under other suitable conditions, and the present disclosure is not limited thereto. For example, when resource reselection is performed by the first terminal and the first terminal detects that the number of receiving terminals feeding back Physical Sidelink Feedback Channels (PSFCHs) is smaller than a certain threshold, the first terminal may transmit the reference resource set.

Figure 11:
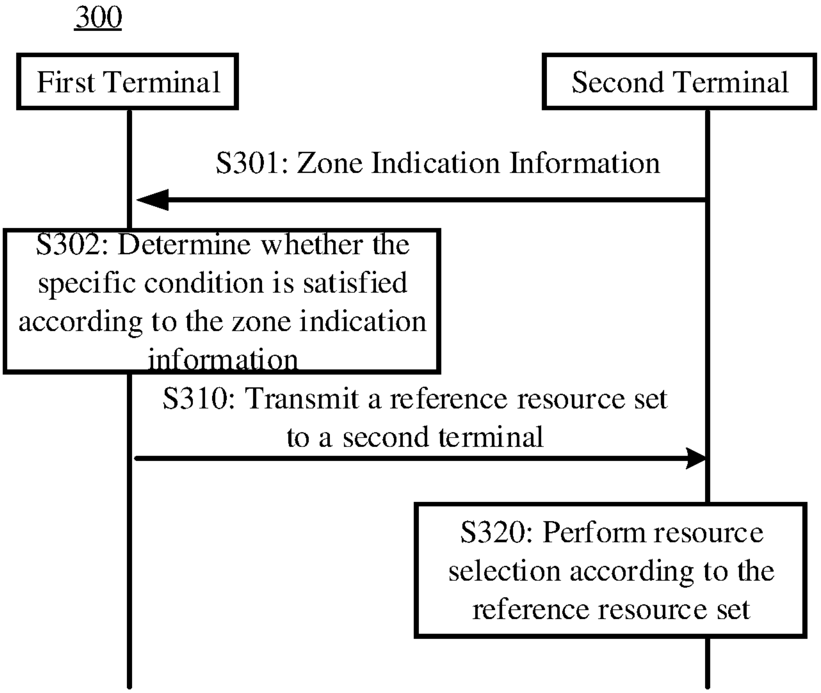
FIG. 11 is a schematic interaction diagram showing another wireless communication method according to an embodiment of the present disclosure.

Optionally, in some embodiments, as shown in FIG. 11, the method 300 may further include:

at S301, the first terminal receiving zone indication information from the second terminal; and at S302, determining whether the specific condition is satisfied according to the zone indication information.

Optionally, the zone indication information may indicate a specific zone range.

Optionally, in some embodiments, the zone indication information may be carried in first signaling. Optionally, the first signaling may include, for example, at least one of SCI or Media Access Control Control Element (MAC CE), or may include another sidelink message or signaling, e.g., PC5 RRC signaling.

Optionally, in some embodiments, the first signaling may further include identification information of the second terminal, which may be used to uniquely identify the second terminal.

Optionally, the identification information of the second terminal may include at least one of:

a source ID of the second terminal, a member ID of the second terminal, or a random number randomly generated by the second terminal within a specific range.

Optionally, the member ID may refer to an ID indicated by a higher layer of the second terminal to a physical layer of the second terminal when the second terminal receives SCI format 2-A where a Cast Type Indicator field is set to 01 (that is, ACK or NACK is fed back according to a reception result of PSSCH).

Optionally, the specific range may be configured by a network device, preconfigured, or predefined.

In some embodiments, the first terminal may determine whether the specific condition is satisfied according to the geographic location of the first terminal and the specific zone range.

For example, when the geographic location of the first terminal is within the specific zone range, it is determined that the specific condition is satisfied; or if the geographic location of the first terminal is outside the specific zone range, it is determined that the specific condition is not satisfied.

In another example, when the geographic location of the first terminal is within the specific zone range, it is determined that the specific condition is not met; or when the geographic location of the first terminal is outside the specific zone range, it is determined that the specific condition is satisfied.

In some embodiments, the zone indication information may include a first zone ID and a first communication range, and the specific zone range may include a zone range with the first zone ID as a center and the first communication range as a radius. The zone range can be understood as a zone range that is close to the second terminal. There would be typically greater interference if terminals that are close transmit data at the same time. By allowing terminals in this zone range to transmit reference resource sets to the second terminal, the interference problem when close terminals perform resource selection can be avoided.

Figure 12:
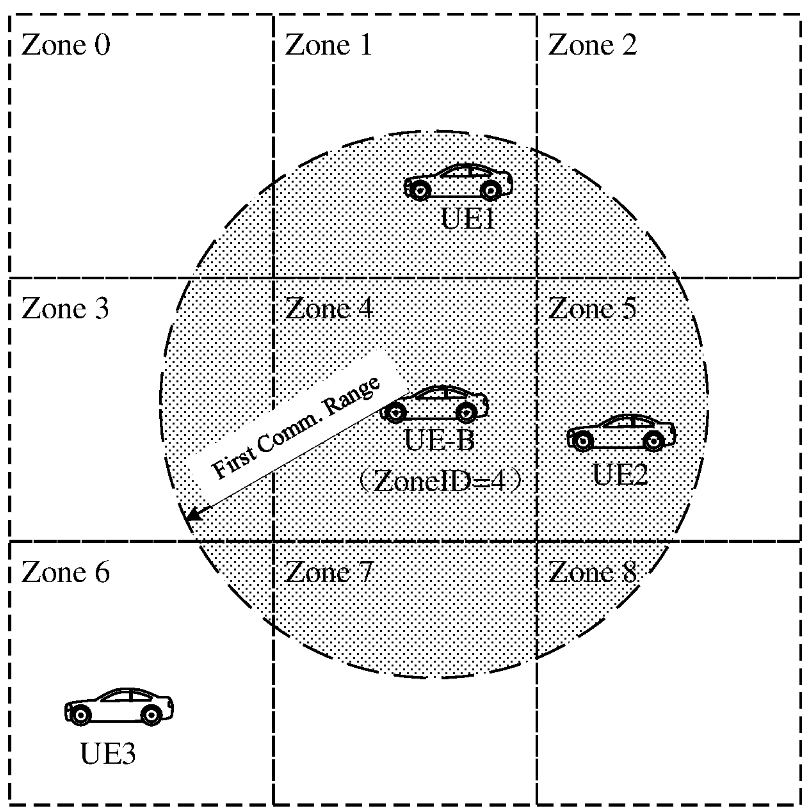
FIGS. 12 and 13 are diagrams showing examples of determining whether a specific condition is satisfied.

For example, as shown in FIG. 12, the first zone ID is the Zone ID of the zone where the second terminal is located. That is, the first zone ID is 4. The specific zone range can be a circle with the center of the zone corresponding to Zone 4 as its center and the first communication range as its radius, as shown in the shaded part in FIG. 12. In FIG. 12, UE1 and UE2 satisfy the specific condition, and UE3 does not satisfy the specific condition.

The scheme of carrying the zone indication information will be described below with reference to specific examples.

Implementation 1: Both the first zone ID and the first communication range are included in the SCI.

Optionally, the SCI may be a second-stage SCI. Optionally, the format of the second-stage SCI may be format 2-B.

Implementation 2: Both the first zone ID and the first communication range are included in the MAC CE.

Optionally, in Implementation 2, the SCI transmitted by the second terminal to the first terminal may include a second zone ID and a second communication range. Optionally, the zone range determined according to the second zone ID and the second communication range may be a superset of the zone range determined according to the first zone ID and the first communication range.

Optionally, the SCI here may be an SCI indicating MAC CE transmission.

Optionally, the SCI may be second-stage SCI.

Optionally, the format of the second-stage SCI may be format 2-B.

Implementation 3: The first communication range is included in the MAC CE, and the first zone ID is included in the SCI.

Optionally, in Implementation 3, the SCI may be SCI indicating MAC CE transmission.

Optionally, the SCI may be second-stage SCI.

Optionally, the format of the second-stage SCI may be format 2-B.

Optionally, in Implementation 3, the SCI transmitted by the second terminal to the first terminal may include a second communication range that is greater than or equal to the first communication range.

In some other embodiments, the zone indication information may include a first zone ID, a first communication range, and a second communication range. The first communication range may be smaller than the second communication range, and the specific zone range may include a zone range outside the first zone range and within the second zone range. Here, the first zone range may be a zone range with a zone corresponding to the first zone ID as a center and the first communication range as a radius, and the second zone range is a zone range with a zone corresponding to the first zone ID as a center and the second communication range as a radius.

That is, the specific zone range is a ring range with the zone corresponding to the first zone ID as the center, the first communication range as the inner radius, and the second communication range as the outer radius.

Figures 13, 14, 15:
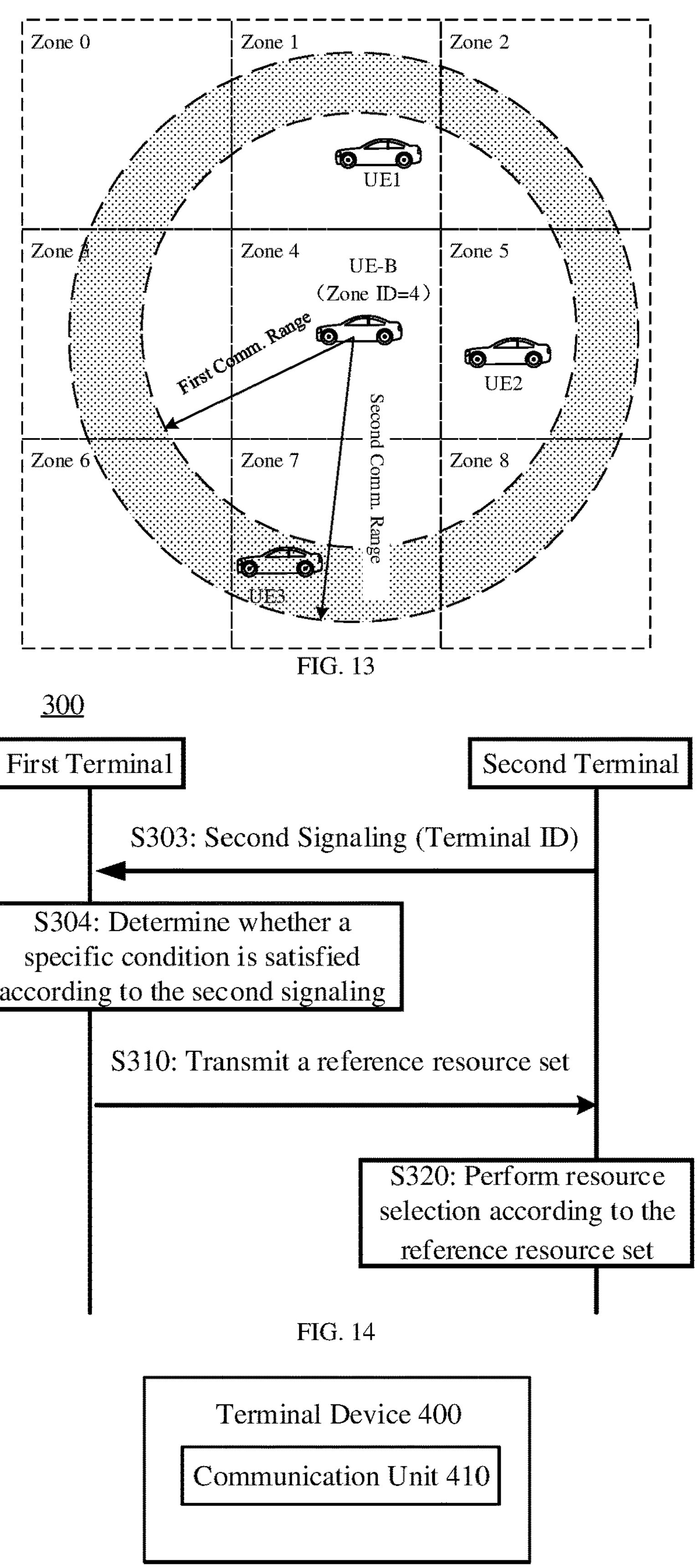
FIG. 14 is a schematic interaction diagram showing another wireless communication method according to an embodiment of the present disclosure.
FIG. 15 is a schematic block diagram of a terminal device according to an embodiment of the present disclosure.

For example, as shown in FIG. 13, the first zone ID is the Zone ID of the zone where the second terminal is located, i.e., the first zone ID is 4. The specific zone range can be an annular zone with the center of the zone corresponding to Zone 4 as its center, the first communication range as its inner radius, and the second communication range as its outer radius, as shown in the shaded part in FIG. 13. In FIG. 13, UE1 and UE2 do not satisfy the specific condition, and UE3 satisfies the specific condition.

In some other embodiments, the zone indication information may include at least one zone ID, and the specific zone range may include a zone range consisting of a zone corresponding to each of the at least one zone ID.

Optionally, in some embodiments, the at least one zone ID may be included in a MAC CE or SCI.

When the at least one zone ID is included in the MAC CE, the SCI transmitted by the second terminal to the first terminal may further include a target zone ID and a target communication range.

Optionally, the zone range determined according to the target zone ID and the target communication range may include a zone range consisting of a zone corresponding to the at least one zone ID, or a distance between a zone corresponding to the at least one zone ID and a center of a zone corresponding to the target zone ID is smaller than or equal to the target communication range.

Optionally, in some embodiments of the present disclosure, as shown in FIG. 14, the method 300 may further include:

at S303, the first terminal receiving second signaling transmitted by the second terminal, the second signaling including identification information of a target terminal that is allowed to transmit the reference resource set to the second terminal; and at S304, the first terminal determining whether the specific condition is satisfied according to the identification information of the first terminal and the identification information of the target terminal.

In some embodiments, for a PSCCH/PSSCH transmitted by the second terminal, if the receiving terminal feeds back a HARQ-ACK when the PSSCH is successfully decoded, feeds back a HARQ-NACK when the PSCCH is successfully decoded but the PSSCH is not successfully decoded, or otherwise feeds back no HARQ information, then for the receiving terminal of the second terminal, when receiving the second signaling from the second terminal and the second signaling contains the identification information of the target terminal, it can determine whether the specific condition is satisfied according to the identification information of the target terminal and its own identification information.

Optionally, in some embodiments, the second signaling may be SCI, more specifically, the second signaling may be second-stage SCI.

Optionally, in other embodiments, the second signaling may be MAC CE or PC5 RRC signaling.

Optionally, the first terminal may determine that the specific condition is satisfied when the identification information of the first terminal is included in the identification information of the target terminal; or otherwise determine that the specific condition is not satisfied.

That is, the first terminal may receive the second signaling transmitted by the second terminal, and the second signaling may include the identification information of the target terminal that is allowed to transmit the reference resource set to the second terminal. When the identification information of the first terminal is included in the identification information of the target terminal, the first terminal can transmit the reference resource set to the second terminal, or otherwise the reference resource set is not transmitted.

Optionally, in some embodiments, the second terminal may transmit the second signaling by means of multicast.

Optionally, in some embodiments, the identification information of the target terminal may include at least one of:

a destination ID or a member ID of the target terminal.

As an example, when the source ID of the first terminal is included in the destination ID in the second signaling, it may be determined that the specific condition is satisfied. As yet another example, when the member ID of the first terminal is included in the member ID in the second signaling, it may be determined that the specific condition is satisfied.

Optionally, in some embodiments, the second signaling may further include the identification information of the second terminal. For example, for the specific content of the identification information of the second terminal in the second signaling, reference may be made to the above specific implementation of the identification information of the second terminal in the first signaling, and details thereof will be omitted here for the sake of brevity.

Optionally, in some embodiments, the second terminal may determine which terminals are target terminals according to information such as data reception conditions of receiving terminals to which the second terminal transmits data, geographic locations of terminal devices, the number of member terminals in the communication group, etc.

For example, when the second terminal performs multicast communication with a plurality of terminals, the second terminal may determine that one or more specific terminals are target terminals in response to receiving N1 consecutive HARQ-NACK feedbacks from the one or more specific terminals. Optionally, N1 may be predefined, configured by a network device, or preconfigured.

In another example, the second terminal may determine a terminal having a distance from the second terminal that is greater than a certain threshold as a target terminal.

In another example, when the number of member terminals in the group is smaller than M, the second terminal may determine that all member terminals are target terminals. Optionally, the value of M may be predefined, configured by a network device, or preconfigured.

Optionally, a value of a specific field in the second signaling being a specific value may indicate that a plurality of terminals all need to transmit reference resource sets to the second terminal. Optionally, the plurality of terminals may be other member terminals in the communication group to which the second terminal belongs, or part or all of the receiving terminals of the data transmitted by the second terminal, for example, part or all of receiving terminals in broadcast communication.

Optionally, the specific field may be a member ID field, and the member ID field having a specific value, such as a reserved value or an invalid value, indicates that all other member terminals in the communication group to which the second terminal belongs need to transmit the reference resource set to the second terminal.

When the first terminal determines that the specific condition is satisfied, the first terminal determines the reference resource set, for example, the reference resource set may be composed of resources suitable for transmission by the second terminal within a specific time and a frequency range, e.g., resources determined by the first terminal as not being reserved by other terminals within a resource selection window of the second terminal, or composed of resources that are not suitable for transmission by the second terminal within a specific time and a frequency range, e.g., resources determined by the first terminal as being reserved by other terminals within a resource selection window of the second terminal, or resources that conflict with other terminals in a resource pool reserved for the second terminal, or part or all of resources pre-selected after the terminal performs resource reselection.

Optionally, in some embodiments, the reference resource set may include at least one of the following resources:

- time-frequency resources within a certain time range in the future, e.g., time-frequency resources within a time range [A, B];
- resources reserved by the second terminal via signaling, e.g., resources reserved by the second terminal via PSCCH for retransmission of the same TB, or resources for new transmission or retransmission of a new TB;
- resources pre-selected by the second terminal but not yet reserved via signaling; or
- resources already used by the second terminal, for example, resources used by the second terminal in a past period of time.

Optionally, in an embodiment of the present disclosure, S310 may specifically include:

- the first terminal transmitting third signaling to the second terminal, the third signaling including the reference resource set.

Optionally, the third signaling may include at least one of: SCI, MAC CE, or PC5 RRC signaling.

Optionally, the SCI may be second-stage SCI.

Optionally, the third signaling may further include identification information of the second terminal.

Optionally, the identification information of the second terminal may include at least one of:

- a source ID of the second terminal, a random number randomly generated by the second terminal within a specific range, or a specific value that is a value of a destination ID field in SCI when a fourth terminal transmits a sidelink transmission to the second terminal, the fourth terminal being the first terminal or another terminal.

Optionally, the third signaling may be SCI, and the identification information of the second terminal may be carried in a destination ID field or another information field in the SCI, and the present disclosure is not limited thereto.

Optionally, in an embodiment of the present disclosure, the third signaling may be carried in a physical channel, such as PSSCH or PSCCH. That is, the reference resource set and the identification information of the second terminal may be carried in a physical channel.

As an example, when the reference resource set is transmitted via the second-stage SCI, the Destination ID field in the second-stage SCI can be set as the identification information of the second terminal indicated in the first signaling or second signaling transmitted by the second terminal, e.g., the source ID or member ID of the second terminal, or the random number generated randomly by the second terminal.

As another example, when the reference resource set is transmitted via the second-stage SCI, the Destination ID field in the second-stage SCI can be set as a specific value, which can be a value set in the "Destination ID" in the second-stage SCI for indicating a PSSCH transmission when the fourth terminal transmits data to the second terminal.

As another example, when the reference resource set is transmitted via the second-stage SCI, a value of a specific field in the second-stage SCI may be set as the identification information of the second terminal indicated in the first signaling or second signaling transmitted by the second terminal, e.g., the source ID or member ID of the second terminal, or the random number generated randomly by the second terminal.

As another example, when the reference resource set is transmitted via the MAC CE or PC5 RRC signaling, the MAC CE or PC5 RRC signaling may include the source ID or member ID of the second terminal, or the random number generated randomly by the second terminal.

As another example, when the reference resource set is transmitted via the MAC CE or PC5 RRC signaling, the Destination ID field in the SCI indicating PSSCH transmission associated with the MAC CE or PC5 RRC can be set to a specific value, which may be a value set in the "Destination ID" in the second-stage SCI for indicating a PSSCH transmission when the fourth terminal transmits data to the second terminal.

To summarize, on one hand, the first terminal only transmits the reference resource set under a specific condition, which can reduce the burden on the second terminal due to the complexity in resource selection by the second terminal when the second terminal receives reference resource sets transmitted from too many terminals. On the other hand, the first terminal only transmits the reference resource set under a specific condition, e.g., when the geographic location of the first terminal is within a specific zone, which is advantageous in that the first terminal only reports the determined reference resource set to the terminal for which the reference resource set has the highest reference value, so as to improve the reliability of subsequent data transmission.

The method embodiments of the present disclosure have been described in detail above with reference to FIGS. 10-14, and the apparatus embodiments of the present disclosure will be described in detail below with reference to FIGS. 15-18. It should be understood that the apparatus embodiments and the method embodiments correspond to each other, and for similar descriptions, reference can be made to the method embodiments.

FIG. 15 shows a schematic block diagram of a terminal device 400 according to an embodiment of the present disclosure. As shown in FIG. 15, the terminal device 400 includes:

a communication unit 410 configured to transmit, when a specific condition is satisfied, a reference resource set to a second terminal, the reference resource set being used by the second terminal to select a sidelink resource.

Optionally, in some embodiments, the specific condition may include at least one of:

- one or more resources reserved by the second terminal for future interfering with a resource reserved by another terminal;
- a resource used by the second terminal to transmit a sidelink channel in future overlapping a resource used by a third terminal to transmit a sidelink channel, the second terminal being a receiving terminal of the sidelink channel transmitted by the third terminal;
- a distance between the terminal device and the second terminal being greater than a first threshold and smaller than a second threshold;
- the terminal device failing to decode the sidelink channel transmitted by the second terminal for N consecutive times, where N is a positive integer;
- the terminal device receiving first indication information from the second terminal, the first indication information indicating that a member terminal of a group to which the terminal device belongs is allowed to transmit the reference resource set to the second terminal;

the terminal device receiving second indication information from the second terminal, the second indication information indicating that the terminal device is allowed to transmit the reference resource set to the second terminal; or the terminal device having performed resource reselection, and a number of member terminals in a group where the second terminal belongs is smaller than a third threshold.

Optionally, in some embodiments, the distance between the terminal device and the second terminal may be a distance between a geographic location of the terminal device and a center of a zone corresponding to a target zone identity (ID), the target zone ID being included in Sidelink Control Information (SCI) transmitted by the second terminal to the terminal device.

Optionally, in some embodiments, the first threshold may be preconfigured, configured by a network device, predefined, or configured by the second terminal.

Optionally, in some embodiments, the second threshold may be a target communication distance carried in SCI transmitted by the second terminal to the terminal device.

Optionally, in some embodiments, N may be preconfigured, configured by a network device, predefined, or configured by the second terminal.

Optionally, in some embodiments, the terminal device 400 may further include:

a processing unit configured to determine whether the specific condition is satisfied according to a geographic location of the terminal device.

Optionally, in some embodiments, the processing unit may be configured to:

determine whether the specific condition is satisfied according to the geographic location of the terminal device and zone indication information transmitted by the second terminal, the zone indication information indicating a specific zone range.

Optionally, in some embodiments, the processing unit may be configured to:

determine that the specific condition is satisfied when the geographic location of the terminal device is within the specific zone range.

Optionally, in some embodiments, the zone indication information may be transmitted via at least one of the following signaling:

SCI or Media access Control (MAC) Control Element (CE).

Optionally, in some embodiments, the zone indication information may include a first zone ID and a first communication range, and the specific zone range may include a zone range with the first zone ID as a center and the first communication range as a radius.

Optionally, in some embodiments, both the first zone ID and the first communication range may be included in the SCI.

Optionally, in some embodiments, both the first zone ID and the first communication range are included in the MAC CE.

Optionally, in some embodiments, the SCI transmitted by the second terminal to the terminal device may include a second zone ID and a second communication range. The zone range determined according to the second zone ID and the second communication range may be a superset of the zone range determined according to the first zone ID and the first communication range.

Optionally, in some embodiments, the first communication range may be included in the MAC CE, and the first zone ID may be included in the SCI.

Optionally, in some embodiments, the SCI transmitted by the second terminal to the terminal device may include a second communication range that is greater than or equal to the first communication range.

Optionally, in some embodiments, the zone indication information may include a first zone ID, a first communication range, and a second communication range, and the first communication range is smaller than the second communication range, and the specific zone range may include a zone range outside the first zone range and within the second zone range.

The first zone range may be a zone range with a zone corresponding to the first zone ID as a center and the first communication range as a radius, and the second zone range may be a zone range with a zone corresponding to the first zone ID as a center and the second communication range as a radius.

Optionally, in some embodiments, the zone indication information may include at least one zone ID, and the specific zone range may include a zone range consisting of a zone corresponding to each of the at least one zone ID.

Optionally, in some embodiments, the at least one zone ID may be included in a MAC CE.

Optionally, in some embodiments, the SCI transmitted by the second terminal to the terminal device may include a target zone ID and a target communication range. A distance between a zone corresponding to the at least one zone ID and a center of a zone corresponding to the target zone ID may be smaller than or equal to the target communication range.

Optionally, in some embodiments, the zone indication information may be carried in first signaling, and the first signaling may further include identification information of the second terminal.

Optionally, in some embodiments, the identification information of the second terminal may include at least one of:

a source ID of the second terminal or a random number randomly generated by the second terminal within a specific range.

Optionally, in some embodiments, the communication unit 410 may be further configured to:

receive second signaling transmitted by the second terminal, the second signaling including identification information of a target terminal that is allowed to transmit the reference resource set to the second terminal.

Optionally, in some embodiments, the terminal device 400 may further include:

a processing unit configured to determine that the specific condition is satisfied when the identification information of the terminal device is included in the identification information of the target terminal.

Optionally, in some embodiments, the identification information of the target terminal may include at least one of:

a destination ID or a member ID of the target terminal.

Optionally, in some embodiments, the reference resource set may be carried by third signaling, the third signaling being transmitted via at least one of the following signaling: SCI, MAC CE, or PC5 RRC signaling.

Optionally, in some embodiments, the third signaling may further include identification information of the second terminal.

Optionally, in some embodiments, the identification information of the second terminal may include at least one of: a source ID of the second terminal, a member ID of the second terminal, a random number randomly generated by the second terminal within a specific range, or a specific value that is a value of a destination ID field in SCI when a fourth terminal transmits a sidelink transmission to the second terminal, the fourth terminal being the terminal device or another terminal.

Optionally, in some embodiments, the above communication unit may be a communication interface or a transceiver, or an input/output interface of a communication chip or a system-on-chip. The above processing unit may be one or more processors.

It should be understood that the terminal device 500 according to the embodiment of the present disclosure may correspond to the second terminal in the method embodiment of the present disclosure, and the above and other operations and/or functions of the respective units in the terminal device 500 are provided for the purpose of implementing the process flow corresponding to the first terminal in the method 300 shown in FIGS. 10-14, and details thereof will be not omitted here for brevity.

Figure 16:
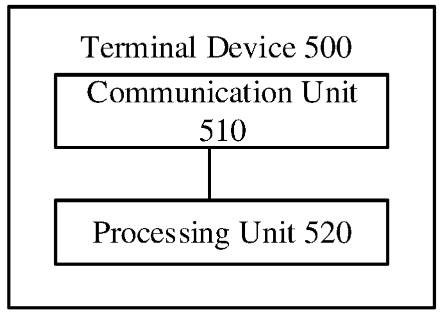
FIG. 16 is a schematic block diagram of another terminal device according to an embodiment of the present disclosure.

FIG. 16 shows a schematic block diagram of a terminal device 500 according to an embodiment of the present disclosure. As shown in FIG. 16, the terminal device 500 includes:

- a communication unit 510 configured to receive a reference resource set transmitted by a first terminal when a condition is satisfied; and
- a processing unit 520 configured to select a sidelink resource according to the reference resource set.

Optionally, in some embodiments, the specific condition may include at least one of:

- one or more resources reserved by the terminal device for future interfering with a resource reserved by another terminal;
- a resource used by the terminal device to transmit a sidelink channel in future overlapping a resource used by a third terminal to transmit a sidelink channel, the terminal device being a receiving terminal of the sidelink channel transmitted by the third terminal;
- a distance between the first terminal and the terminal device being greater than a first threshold and smaller than a second threshold;
- the first terminal failing to decode the sidelink channel transmitted by the terminal device for N consecutive times, where N is a positive integer;
- the first terminal receiving first indication information from the terminal device, the first indication information indicating that a member terminal of a group to which the first terminal belongs is allowed to transmit the reference resource set to the terminal device;
- the first terminal receiving second indication information from the terminal device, the second indication information indicating that the first terminal is allowed to transmit the reference resource set to the terminal device; or
- the first terminal having performed resource reselection, and a number of member terminals in a group where the terminal device belongs is smaller than a third threshold.

Optionally, in some embodiments, the distance between the first terminal and the terminal device may be a distance between a geographic location of the first terminal and a center of a zone corresponding to a target zone identity (ID), the target zone ID being included in Sidelink Control Information (SCI) transmitted by the terminal device to the first terminal.

Optionally, in some embodiments, the first threshold may be preconfigured, configured by a network device, predefined, or configured by the terminal device.

Optionally, in some embodiments, the second threshold may be a target communication distance carried in SCI transmitted by the terminal device to the first terminal.

Optionally, in some embodiments, N may be preconfigured, configured by a network device, predefined, or configured by the terminal device.

Optionally, in some embodiments, the communication unit 510 may be further configured to:

- transmit zone indication information to the first terminal, the zone indication information indicating a specific zone range, and the zone indication information being used by the first terminal to determine whether the specific condition is satisfied.

Optionally, in some embodiments, the zone indication information may be transmitted via at least one of the following signaling:

- SCI or Media access Control (MAC) Control Element (CE).

Optionally, in some embodiments, the zone indication information may include a first zone ID and a first communication range, and the specific zone range may include a zone range with the first zone ID as a center and the first communication range as a radius.

Optionally, in some embodiments, both the first zone ID and the first communication range may be included in the SCI.

Optionally, in some embodiments, both the first zone ID and the first communication range may be included in the MAC CE.

Optionally, in some embodiments, the SCI transmitted by the terminal device to the first terminal may include a second zone ID and a second communication range. The zone range determined according to the second zone ID and the second communication range may be a superset of the zone range determined according to the first zone ID and the first communication range.

Optionally, in some embodiments, the first communication range may be included in the MAC CE, and the first zone ID may be included in the SCI.

Optionally, in some embodiments, the SCI transmitted by the terminal device to the first terminal may include a second communication range that is greater than or equal to the first communication range.

Optionally, in some embodiments, the zone indication information may include a first zone ID, a first communication range, and a second communication range, and the first communication range is smaller than the second communication range, and the specific zone range may include a zone range outside the first zone range and within the second zone range.

The first zone range may be a zone range with a zone corresponding to the first zone ID as a center and the first communication range as a radius, and the second zone range may be a zone range with a zone corresponding to the first zone ID as a center and the second communication range as a radius.

Optionally, in some embodiments, the zone indication information may include at least one zone ID, and the specific zone range may include a zone range consisting of a zone corresponding to each of the at least one zone ID.

Optionally, in some embodiments, the at least one zone ID may be included in a MAC CE.

Optionally, in some embodiments, the SCI transmitted by the terminal device to the first terminal may include a target zone ID and a target communication range. A distance between a zone corresponding to the at least one zone ID and a center of a zone corresponding to the target zone ID may be smaller than or equal to the target communication range.

Optionally, in some embodiments, the zone indication information may be carried in first signaling, and the first signaling may further include identification information of the terminal device.

Optionally, in some embodiments, the communication unit 510 may be further configured to:

transmit second signaling to the first terminal, the second signaling including identification information of a target terminal that is allowed to transmit the reference resource set to the terminal device.

Optionally, in some embodiments, the identification information of the target terminal may include at least one of:

a destination ID or a member ID of the target terminal.

Optionally, in some embodiments, the processing unit 520 may be further configured to:

determine the target terminal according to at least one of: a data reception condition of at least one first terminal, a geographic location of at least one first terminal, or a number of first terminals.

Optionally, in some embodiments, the terminal device may transmit the second signaling by means of multicast.

Optionally, in some embodiments, a value of a specific field in the second signaling being a specific value may indicate that a number of first terminals need to transmit the reference resource set to the terminal device.

Optionally, in some embodiments, when the number of the first terminals is smaller than a fourth threshold, the value of the specific field in the second signaling may be the specific value.

Optionally, in some embodiments, the fourth threshold may be predefined, or configured by a network device.

Optionally, in some embodiments, the second signaling may further include identification information of the terminal device.

Optionally, in some embodiments, the reference resource set may be carried by third signaling, the third signaling including at least one of the following signaling: SCI, MAC CE, or PC5 RRC signaling.

Optionally, in some embodiments, the third signaling may further include identification information of the terminal device.

Optionally, in some embodiments, the identification information of the terminal device may include at least one of:

a source ID of the terminal device, a member ID of the terminal device, a random number randomly generated by the terminal device within a specific range, or a specific value that is a value of a destination ID field in SCI when a fourth terminal transmits a sidelink transmission to the terminal device, the fourth terminal being the first terminal or another terminal.

Optionally, in some embodiments, the above communication unit may be a communication interface or a transceiver, or an input/output interface of a communication chip or a system-on-chip. The above processing unit may be one or more processors.

It should be understood that the terminal device 500 according to the embodiment of the present disclosure may correspond to the second terminal in the method embodiment of the present disclosure, and the above and other operations and/or functions of the respective units in the terminal device 500 are provided for the purpose of implementing the process flow corresponding to the second terminal in the method 300 shown in FIGS. 10-14, and details thereof will be not omitted here for brevity.

Figure 17:
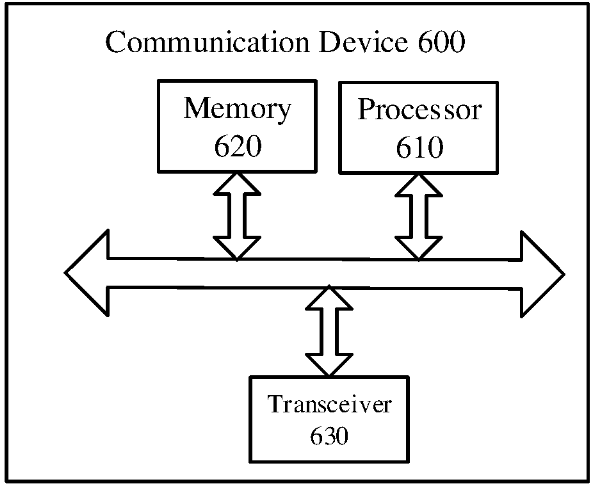
FIG. 17 is a schematic block diagram of a communication device according to another embodiment of the present disclosure.

FIG. 17 is a schematic diagram showing a structure of a communication device 600 according to an embodiment of the present disclosure. The communication device 600 shown in FIG. 17 includes a processor 610, and the processor 610 can invoke and execute a computer program from a memory to implement the method in the embodiment of the present disclosure.

Optionally, as shown in FIG. 17, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 17, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the first terminal/second terminal according to the embodiment of the present disclosure, and the communication device 600 may implement the corresponding processes implemented by the first terminal/second terminal in any of the methods according to the embodiments of the present disclosure. For the sake of brevity, details thereof will be omitted here.

Figure 18:
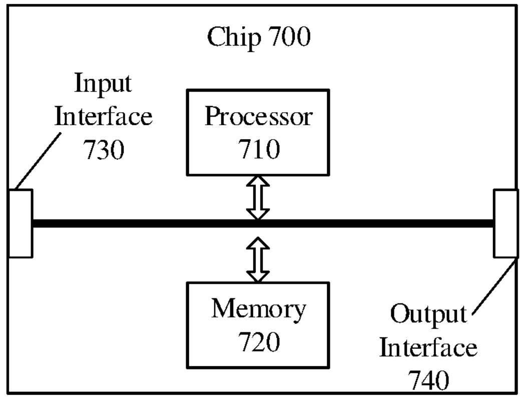
FIG. 18 is a schematic block diagram of a chip according to an embodiment of the present disclosure.

FIG. 18 is a schematic diagram showing a structure of a chip according to an embodiment of the present disclosure. The chip 700 shown in FIG. 18 includes a processor 710, and the processor 710 can invoke and execute a computer program from a memory to implement the method in the embodiment of the present disclosure.

Optionally, as shown in FIG. 18, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the first terminal/second terminal in the embodiment of the present disclosure, and the chip can implement the corresponding processes implemented by the first terminal/second terminal in the various methods of the embodiments of the present disclosure. For the sake of brevity, details thereof will be omitted here.

Optionally, the chip in the embodiment of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the first terminal/second terminal in the embodiment of the present disclosure, and the computer program can cause a computer to perform corresponding procedures implemented by the first terminal/second terminal in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the first terminal/second terminal in the embodiment of the present disclosure, and the computer program instructions can cause a computer to perform corresponding procedures implemented by the first terminal/second terminal in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the first terminal/second terminal in the embodiment of the present disclosure. The computer program, when executed on a computer, can cause the computer to perform corresponding procedures implemented by the first terminal/second terminal in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:

transmitting, by a first terminal in a case that a specific condition is satisfied, a reference resource set to a second terminal, and not transmitting, by the first terminal, the reference resource set to the second terminal in a case where the specific condition is not satisfied;

wherein the reference resource set is configured for the second terminal to select a sidelink resource, the first terminal is a resource coordination terminal in a sidelink communication, the second terminal is a terminal in the sidelink communication, wherein the first terminal and the second terminal communicate with each other over the sidelink communication, the reference resource set is determined by the first terminal, and the specific condition comprises at least one of following:

the first terminal receives sidelink control information (SCI) from the second terminal, and determines, based on the SCI, that one or more resources reserved by the second terminal for a later time cause interference with a resource reserved by another terminal, wherein the another terminal is a terminal except the second terminal in the sidelink communication, and the second terminal and the another terminal communicate with each other over the sidelink communication;

the first terminal receives second indication information from the second terminal, the second indication information indicating that the first terminal is allowed to transmit the reference resource set to the second terminal; or the first terminal receives SCI from the second terminal, and determines, based on the SCI, that a transmission resource of the second terminal overlaps with a reception resource of the second terminal.

2. The method according to claim 1, further comprising:

receiving, by the first terminal, second signaling transmitted by the second terminal, the second signaling comprising identification information of a target terminal that is allowed to transmit the reference resource set to the second terminal.

3. The method according to claim 2, further comprising:

determining, by the first terminal, that the specific condition is satisfied when identification information of the first terminal is included in the identification information of the target terminal.

4. The method according to claim 3, wherein the identification information of the target terminal comprises at least one of:

a destination ID or a member ID of the target terminal.

5. The method according to claim 1, wherein the reference resource set is carried by third signaling, the third signaling being transmitted via at least one of the following signaling:

SCI, MAC CE, or PC5 RRC signaling.

6. The method according to claim 5, wherein the third signaling further comprises identification information of the second terminal, wherein the identification information of the second terminal comprises:

a source ID of the second terminal.

7. A wireless communication method, comprising:

receiving, by a second terminal, a reference resource set transmitted by a first terminal in a case that a specific condition is satisfied, wherein the reference resource set is not transmitted by the first terminal in a case where the specific condition is not satisfied, and the reference resource set is configured for the second terminal to select a sidelink resource, the first terminal is a resource coordination terminal in a sidelink communication, the second terminal is a terminal in the sidelink communication, wherein the first terminal and the second terminal communicate with each other over the sidelink communication, the reference resource set is determined by the first terminal; and selecting, by the second terminal, a sidelink resource according to the reference resource set;

wherein the specific condition comprises at least one of following:

the first terminal receives sidelink control information (SCI) from the second terminal, and determines, based on the SCI, that one or more resources reserved by the second terminal for a later time cause interference with a resource reserved by another terminal, wherein the another terminal is a terminal except the second terminal in the sidelink communication, and the second terminal and the another terminal communicate with each other over the sidelink communication;

the first terminal receives second indication information from the second terminal, the second indication information indicating that the first terminal is allowed to transmit the reference resource set to the second terminal; or the first terminal receives SCI from the second terminal, and determines, based on the SCI, that a transmission resource of the second terminal overlaps with a reception resource of the second terminal.

8. The method according to claim 7, further comprising:

transmitting, by the second terminal, second signaling to the first terminal, the second signaling comprising identification information of a target terminal that is allowed to transmit the reference resource set to the second terminal.

9. The method according to claim 8, wherein the identification information of the target terminal comprises at least one of:

a destination ID or a member ID of the target terminal.

10. The method according to claim 7, wherein the reference resource set is carried by third signaling, the third signaling comprising at least one of the following signaling:

SCI, MAC CE, or PC5 RRC signaling.

11. The method according to claim 10, wherein the third signaling further comprises identification information of the second terminal, wherein the identification information of the second terminal comprises:

a source ID of the second terminal.

12. A terminal device, comprising:

a processor and a memory, wherein the memory has a computer program stored thereon, and the processor is configured to invoke and execute the computer program stored in the memory to:

transmit, in a case that a specific condition is satisfied, a reference resource set to a second terminal, and not transmit the reference resource set to the second terminal in a case where the specific condition is not satisfied;

wherein the reference resource set is configured for the second terminal to select a sidelink resource, the first terminal is a resource coordination terminal in a sidelink communication, the second terminal is a terminal in the sidelink communication, wherein the first terminal and the second terminal communicate with each other over the sidelink communication, the reference resource set is determined by the terminal device, and the specific condition comprises at least one of following:

the terminal device receives sidelink control information (SCI) from the second terminal, and determines, based on the SCI, that one or more resources reserved by the second terminal for later time cause interference with a resource reserved by another terminal, wherein the another terminal is a terminal except the second terminal in the sidelink communication, and the second terminal and the another terminal communicate with each other over the sidelink communication;

the terminal device receives second indication information from the second terminal, the second indication information indicating that the terminal device is allowed to transmit the reference resource set to the second terminal; or the terminal device receives SCI from the second terminal, and determines, based on the SCI, that a transmission resource of the second terminal overlaps with a reception resource of the second terminal.

13. The terminal device according to claim 12, wherein the processor is further configured to invoke and execute the computer program stored in the memory to:

receive second signaling transmitted by the second terminal, the second signaling comprising identification information of a target terminal that is allowed to transmit the reference resource set to the second terminal.

14. The terminal device according to claim 13, wherein the processor is further configured to invoke and execute the computer program stored in the memory to:

determine that the specific condition is satisfied when identification information of the terminal device is included in the identification information of the target terminal.

15. The terminal device according to claim 14, wherein the identification information of the target terminal comprises at least one of:

a destination ID or a member ID of the target terminal.

16. The terminal device according to claim 12, wherein the reference resource set is carried by third signaling, the third signaling being transmitted via at least one of the following signaling:

SCI, MAC CE, or PC5 RRC signaling.

17. A terminal device, comprising:

a processor and a memory, wherein the memory has a computer program stored thereon, and the processor is configured to invoke and execute the computer program stored in the memory to perform a method comprising:

receiving, by a second terminal, a reference resource set transmitted by a first terminal in a case that a specific condition is satisfied, wherein the reference resource set is not transmitted by the first terminal in a case where the specific condition is not satisfied, and the reference resource set is configured for the second terminal to select a sidelink resource, the first terminal is a resource coordination terminal in a sidelink communication, the second terminal is a terminal in the sidelink communication, wherein the first terminal and the second terminal communicate with each other over the sidelink communication, the reference resource set is determined by the first terminal; and selecting, by the second terminal, a sidelink resource according to the reference resource set;

wherein the specific condition comprises at least one of following:

the first terminal receives sidelink control information (SCI) from the second terminal, and determines, based on the SCI, that one or more resources reserved by the second terminal for a later time cause interference with a resource reserved by another terminal, wherein the another terminal is a terminal except the second terminal in the sidelink communication, and the second terminal and the another terminal communicate with each other over the sidelink communication;

the first terminal receives second indication information from the second terminal, the second indication information indicating that the first terminal is allowed to transmit the reference resource set to the second terminal; or the first terminal receives SCI from the second terminal, and determines, based on the SCI, that a transmission resource of the second terminal overlaps with a reception resource of the second terminal.

* * * * *